(12) United States Patent
Suntsova et al.

(10) Patent No.: US 9,557,479 B2
(45) Date of Patent: Jan. 31, 2017

(54) MULTILAYER SYSTEM HAVING RECONFIGURABLE DYNAMIC STRUCTURE REINFORCEMENT USING NANOPARTICLE EMBEDDED SUPRAMOLECULAR ADHESIVE AND METHOD

(71) Applicant: THE BOEING COMPANY, Huntington Beach, CA (US)

(72) Inventors: Sofya A Suntsova, Philadelphia, PA (US); Christopher J Felker, Downingtown, PA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/739,128

(22) Filed: Jun. 15, 2015

(65) Prior Publication Data
US 2016/0363727 A1 Dec. 15, 2016

(51) Int. Cl.
*G02B 6/12* (2006.01)
*G05D 24/00* (2006.01)
*B82Y 30/00* (2011.01)

(52) U.S. Cl.
CPC ........... *G02B 6/12002* (2013.01); *G05D 24/00* (2013.01); *B82Y 30/00* (2013.01); *G02B 2006/12069* (2013.01); *G02B 2006/12123* (2013.01); *G02B 2006/12138* (2013.01); *Y10S 977/742* (2013.01); *Y10S 977/779* (2013.01); *Y10S 977/783* (2013.01); *Y10S 977/832* (2013.01)

(58) Field of Classification Search
CPC .................. G02B 6/12002; G02B 6/12; G02B 2006/12123; G02B 2006/12138; G02B 2006/12069; G05D 24/00; Y10S 977/832; Y10S 977/742; Y10S 977/783; Y10S 977/779; B82Y 30/00
See application file for complete search history.

(56) References Cited

U.S. PATENT DOCUMENTS

2016/0215171 A1* 7/2016 Marcellan ................ A61K 8/25

FOREIGN PATENT DOCUMENTS

DE 102008044388 A1 6/2010
WO 2014177688 A1 11/2014

OTHER PUBLICATIONS

Heinzmann, et al; Article entitled: Light-Induced Bonding and Debonding With Supramolecular Adhesives from ACS Applied Materials & Interfaces Publicatios dated Jan. 31, 2014, pp. 4713-4719 Jan. 31, 2014.
Erb, et al; Article entitled: Composies Reinforced in Three Dimensions by Using Low Magnetic Fields from Sciencemag.org dated Jan. 13, 2012, pp. 199-204 Jan. 13, 2012.
Universite de Fribourg; Article entitled: Detaching Glue With Light: Possible Thanks to a Supramolecular Adhesive from http://www.unifr.ch/news/en/12412/, published May 16, 2014.
European Search Report including Written Opinion for EP application 16172227.7-1303 dated Oct. 24, 2016.

* cited by examiner

*Primary Examiner* — Andrew Jordan
(74) *Attorney, Agent, or Firm* — Nexsen Pruet, PLLC

(57) ABSTRACT

Methods, systems and apparatuses are disclosed comprising a tunable multilayered array reinforcement system having a supramolecular adhesive embedded with nanoparticles that are reoriented on-demand in response to or in advance of vibrational effects in a moving or stationary structure.

26 Claims, 7 Drawing Sheets

MULTILAYER SYSTEM HAVING RECONFIGURABLE DYNAMIC STRUCTURE REINFORCEMENT USING NANOPARTICLE EMBEDDED SUPRAMOLECULAR ADHESIVE AND METHOD

TECHNOLOGICAL FIELD

The present disclosure relates generally to the field of vibration and, more specifically, systems addressing mechanical vibration. More particularly, the present disclosure relates to methods, apparatuses and systems that use materials that are able to change the stiffness of a material based on a vibrational environment in order to avoid critical vibrational frequencies. Still more particularly, the present disclosure relates to tuning a structure to multiple desired stiffness modes to avoid critical frequencies.

BACKGROUND

Many structures, such as vehicles vibrate during operation. Further, each structure has a natural or resonant frequency that depends upon its shape or configuration. Structures of various types are frequently designed so that operational vibration does not match the natural frequency of the structure, so as to avoid natural or resonant frequencies. This is done to prevent damage to the structure, since a resonant frequency can focus mechanical energy into a specific location or part of the structure, and exceed the material strength of the structure at that location, potentially causing damage or failure. Exemplary materials used to fabricate parts include, but are not limited to, materials used to fabricate the mast, transmission mounts, landing gears, etc.

Vibrational forces may be caused by motions of engines, electric motors, etc. and even sound waves. While vibrations occasionally may have desirable consequences, in most arenas, it is desirable to counter or substantially eliminate most vibrational forces, or otherwise redirect a material's load path to preserve the structural integrity of a material and/or structure.

One category of vehicles that are affected by this issue is aircraft, such as rotary wing aircraft (e.g. rotorcraft such as helicopters, etc.). Rotorcraft are frequently subject to high vibration environments. Levels of vibration vary based on factors such as the rotor speed(s), environmental factors and payload. In the field of rotorcraft, additional vibrational forces may be induced to rotorcraft via the rotational operation of rotors. Left unchecked, vibrations in rotorcraft, or other large mobile or stationary structures can accelerate structural fatigue in the materials and components comprising the aircraft. For example, the natural frequency of a rotorcraft airframe can be excited by various factors occurring during a flight cycle including but not limited to: landing, taking off, bump, shifting center of gravity of the rotor, etc. If the natural frequency of the airframe materials is close to the rate of rotation of the rotor, the vibration can be amplified, and vibration increases to a level exceeding the strength of materials used to fabricate parts including, but not limited to, the mast, transmission mounts, landing gears, etc.

Vibration levels, in turn, often determine or limit the size and weight of a given rotary wing aircraft, or limit rotor speeds during operation. To address these issues, existing rotorcraft airframes are frequently stiffened by adding mass to the structure in order to avoid undesirable (e.g. resonant) frequencies of vibration. In the case of rotorcraft, the added mass can be significant (e.g. up to or exceeding hundreds of pounds). Improved load-bearing materials can be helpful in addressing this issue, but generally do not, on their own, allow for a reduction in vibration tuning mass. Furthermore, adding parasitic weight can restrict the speed and payload capabilities of the aircraft, as it is generally considered more desirable to have a lighter weight aircraft to allow more payload and/or achieve higher fuel efficiency.

In addition to the selective addition of weight, another approach for avoiding natural or resonant frequencies is to only operate a vehicle within certain operational ranges, so that only certain vibrational frequencies are possible. However, this approach limits the utility of the vehicle.

The present application relates to one or more of the above issues. Apparatuses, systems and methods for avoiding a structure's critical frequency on rotorcrafts that do not appreciably add to the overweight of the rotorcraft, or that would allow design of a rotorcraft to be made independent of the consideration of vibrational forces would be advantageous.

BRIEF SUMMARY

According to one aspect, the present disclosure is directed to a method for changing the stiffness of a structure in response to a vibrational force comprising the steps of activating a multilayer system in a structure. The multilayer system at least comprises: 1) a first layer comprising an adhesive embedded with nanoparticles, with the adhesive having a first modulus value, and the nanoparticles oriented in a first orientation; 2) a second layer proximate to the first layer, with the second layer comprising a light activation system, and 3) an energy input in communication with an energy source, with the energy input also in communication with the first adhesive layer. The light activation system is activated in the second layer to produce light in the second layer. Light produced by the second layer is directed to the first layer. The first modulus value of the adhesive is altered to a second modulus value. Energy is delivered from the energy source to the first layer via the energy input, and the orientation of the nanoparticles in the first layer is predictably changed to be oriented in a second orientation. In a further aspect the method is performed in response to a vibrational force.

In a further aspect, the multilayer system is placed in contact with the structure.

In another aspect, the adhesive comprises a supramolecular adhesive compound.

In another aspect, the adhesive comprises a metallosupramolecular adhesive compound.

In yet another aspect, the supramolecular adhesive compound comprises a telechelic poly(ethylene-co-butylene), terminated with 2,6-bis(1'-methylbenzimidazoyl)-pyridine ligands.

In still another aspect, the nanoparticles comprise metal-containing nanoparticles, metal oxide-containing nanoparticles, carbon nanotubes (CNTs), boron nitride nanotubes (BNNTs), and combinations thereof.

In yet another aspect, the energy source in an electric energy source.

In a further aspect, the energy source is a magnetic energy source and/or electro-magnetic energy source.

In a still further aspect, the second layer comprises a fiber optic component.

In another aspect, the fiber optic component is interwoven into a matrix.

In yet another aspect, the matrix comprises carbon fibers, glass fibers, and combinations thereof.

In a still further aspect, the second layer comprises an LED array.

In another aspect, the energy input controls the amount of energy provided to the first layer.

In a further aspect, the nanoparticles are re-oriented in a predetermined orientation based on the amount of energy provided to the first layer by the energy input. In a further aspect, the nanoparticles are understood to be re-oriented to a second orientation.

In another aspect, the energy provided to the first layer changes the orientation, or re-orients at least a portion of the nanoparticles on-demand.

In a further aspect, preferably before the step of activating the second layer to produce light, vibration is monitored in the structure by sensing vibration in the structure via a vibration sensor, with the sensor in communication with the structure, and the sensor able to generate a signal. The signal is sent from the sensor to a detector, with the detector in communication with the sensor, and the signal sent by the sensor is received by the detector with the detector in communication with the second layer.

In a further aspect, the structure is a stationary structure.

In another aspect, the structure is a vehicle.

In yet another, aspect the vehicle is selected from the group comprising a manned aircraft, an manned spacecraft, a manned rotorcraft, an unmanned aircraft, an unmanned spacecraft, an unmanned rotorcraft, a manned terrestrial vehicle, an unmanned terrestrial vehicle, a manned surface and/or sub-surface waterborne vehicle, an unmanned surface and/or sub-surface waterborne vehicle, and combinations thereof.

In a further aspect, the first layer comprises a plurality of regions, and the orientation of the nanoparticles is selectively changed in at least a first region of the first layer. In a further aspect, the orientation of the nanoparticles is selectively changed in response to a signal sensed by the sensor.

In yet another aspect, the present disclosure relates to a multilayer structure comprising a first layer comprising an adhesive embedded with nanoparticles, with the adhesive having a first modulus value, with the nanoparticles is a first orientation; a second layer proximate to the first layer, with the second layer comprising a light activation system; an energy input in communication with an energy source, with the energy input in communication with the first layer. In a further aspect, the first modulus value is altered on-demand.

In a further aspect, the adhesive comprises a supramolecular adhesive.

In another aspect, the adhesive comprises a metallosupramolecular adhesive compound.

In another aspect, the supramolecular adhesive comprises a compound comprising a telechelic poly(ethylene-co-butylene), but are terminated with 2,6-bis(1'-methylbenzimidazoyl)-pyridine ligands.

In yet another aspect, the nanoparticles comprise metal-containing nanoparticles, metal oxide-containing nanoparticles, carbon nanotubes (CNTs), boron nitride nanotubes (BNNTs), and combinations thereof.

In a further aspect, the energy source is selected from the group comprising: an electric energy source, a magnetic energy source, an electro-magnetic energy source and combinations thereof.

In still another aspect, the second layer comprises a fiber optic component.

In a further aspect, the fiber optic component is interwoven into a matrix.

In yet another aspect, the matrix comprises carbon fibers, glass fibers, and combinations thereof.

In yet another aspect, the energy input controls the amount of energy provided to the first adhesive layer.

In another aspect, the amount of energy provided to the first layer predictably re-orients the nanoparticles in the first layer.

In another aspect, the energy provided to the first adhesive layer changes the orientation of the nanoparticles on-demand.

In a further aspect, the multilayer structure further comprises a sensor for sensing vibration in the structure, with the sensor in communication the structure, and with the sensor able to generate a signal. A processor is in communication with the sensor. According to another aspect, the multilayer structure comprises a detector able to receive a signal from sensor, with the detector in communication with a sensor and a processor.

In a further aspect, the multilayer structure is incorporated into a stationary structure.

In a further aspect, the multilayer structure is incorporated into a vehicle.

In yet another aspect, the vehicle is selected from the group comprising a manned aircraft, an manned spacecraft, a manned rotorcraft, an unmanned aircraft, an unmanned spacecraft, an unmanned rotorcraft, a manned terrestrial vehicle, an unmanned terrestrial vehicle, a manned surface and/or sub-surface waterborne vehicle, an unmanned surface and/or sub-surface waterborne vehicle, and combinations thereof.

In a further aspect, the first layer comprises a plurality of regions, and the orientation of the nanoparticles is selectively changed in at least a first region of the first layer. In a further aspect, the orientation of the nanoparticles is selectively changed in response to a signal sensed by a sensor.

Aspects of the present disclosure are further directed to a multilayer system for changing the stiffness of a structure to avoid critical frequencies in a structure comprising: a first layer comprising an adhesive embedded with nanoparticles, with the adhesive having a first modulus value, and with the nanoparticles oriented in a first orientation; a second layer proximate to the first layer, with the second layer comprising a light activation system; and an energy input in communication with an energy source with the energy input in communication with the first layer.

In a further aspect, the multilayer system is placed in contact with the structure.

In another aspect, the adhesive comprises a supramolecular adhesive compound.

In another aspect, the adhesive comprises a metallosupramolecular adhesive compound.

In another aspect, the adhesive comprises a supramolecular adhesive compound comprises a telechelic poly(ethylene-co-butylene), but are terminated with 2,6-bis(1'-methylbenzimidazoyl)-pyridine ligands.

In still another aspect, the nanoparticles comprise metal-containing nanoparticles, metal oxide-containing nanoparticles, carbon nanotubes (CNTs), boron nitride nanotubes (BNNTs), and combinations thereof.

In yet another aspect, the energy source in an electric energy source.

In a further aspect, the energy source is a magnetic energy source, and/or an electro-magnetic energy source.

In a still further aspect, the second layer comprises a fiber optic component.

In another aspect, the fiber optic component is interwoven into a matrix.

In yet another aspect, the matrix comprises carbon fibers, glass fibers, and combinations thereof.

In a still further aspect, the second layer comprises an LED array.

In another aspect, the energy input controls the amount of energy provided to the first layer.

In a further aspect, the amount of energy provided to the first layer predictably re-orients the nanoparticles in the first layer. In a further aspect, the amount of energy provided to the first layer predictably re-orients the nanoparticles in the first layer to a predetermined second orientation.

In another aspect, the orientation of the nanoparticles is changed on-demand.

In a further aspect, the system further comprises at least one sensor for monitoring vibration in a structure incorporating the system. The sensor senses vibration in the structure via the sensor, with the sensor in communication with the structure, and the sensor able to generate a signal. The signal is sent from the sensor to a processor, with the processor in communication with the sensor, and with a processor in communication with the sensor.

In a further aspect, the system is incorporated into a stationary structure.

In another aspect, the system is incorporated into a vehicle.

In yet another aspect the vehicle is selected from the group comprising a manned aircraft, an manned spacecraft, a manned rotorcraft, an unmanned aircraft, an unmanned spacecraft, an unmanned rotorcraft, a manned terrestrial vehicle, an unmanned terrestrial vehicle, a manned surface and/or sub-surface waterborne vehicle, an unmanned surface and/or sub-surface waterborne vehicle, and combinations thereof.

In a further aspect, the first layer of the system comprises a plurality of regions, and the orientation of the nanoparticles is selectively changed in at least a first region of the first layer in response to a signal sensed by the sensor.

In another aspect, the present disclosure is directed to an apparatus comprising a multilayer system comprising a first layer comprising an adhesive embedded with nanoparticles, with the adhesive having a first modulus value, and with the nanoparticles oriented in a first orientation, and a second layer proximate to the first layer, with the second layer comprising a light activation system.

BRIEF DESCRIPTION OF THE DRAWINGS

Figure 1A:
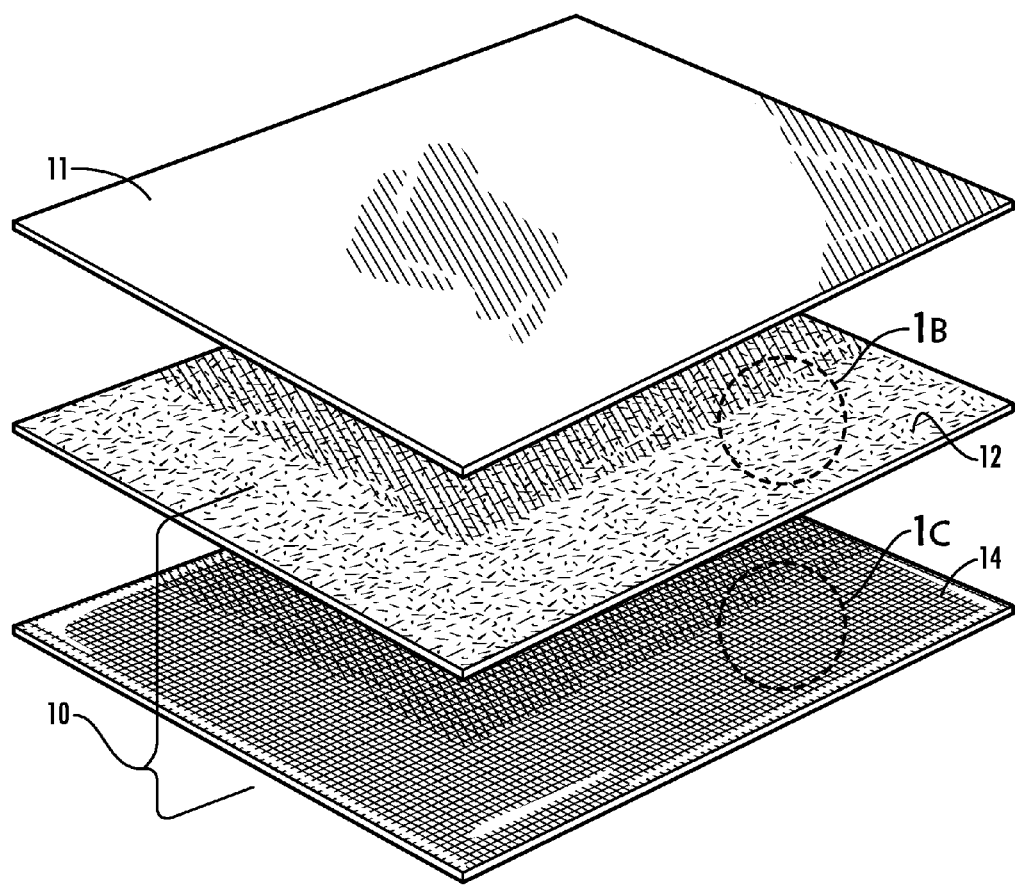
Figure 1B:
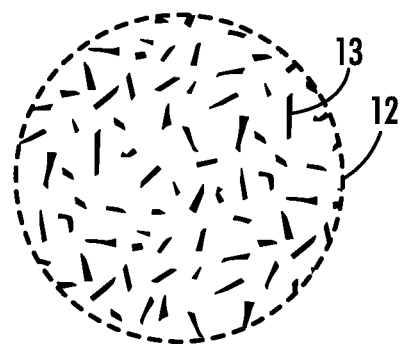
Figure 1C:
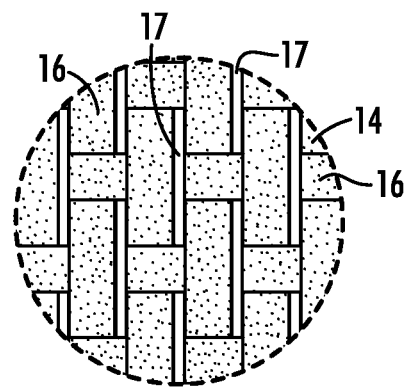
Figure 2:
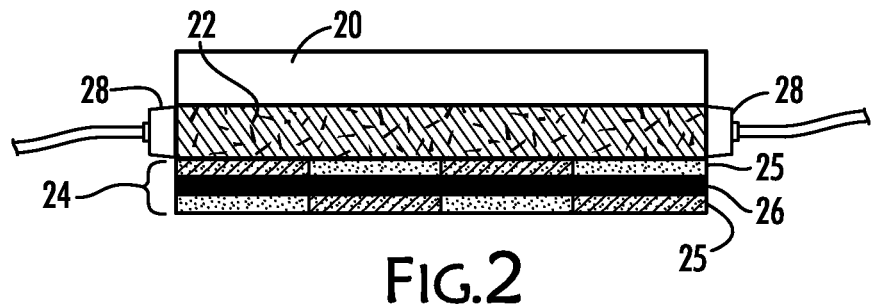
Figure 3:
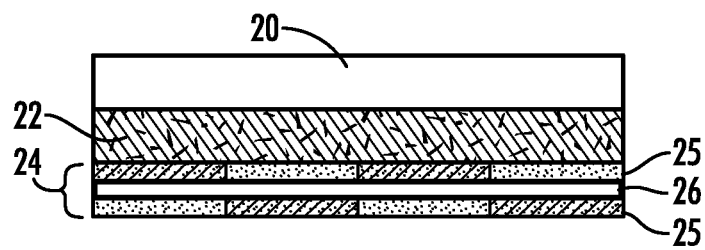
Figure 4:
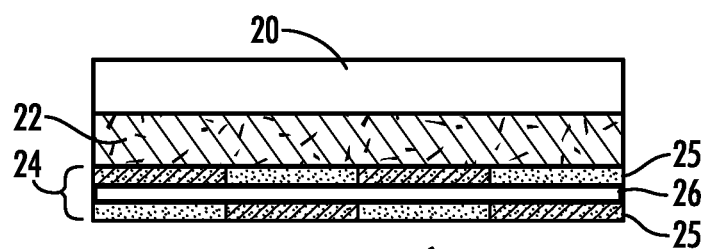
Figure 5:
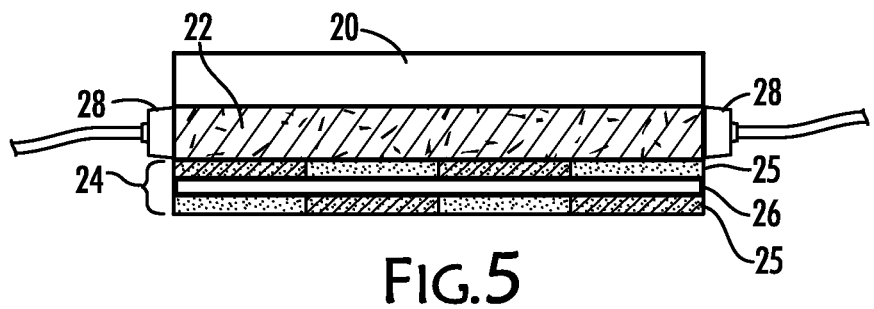
Figure 6:
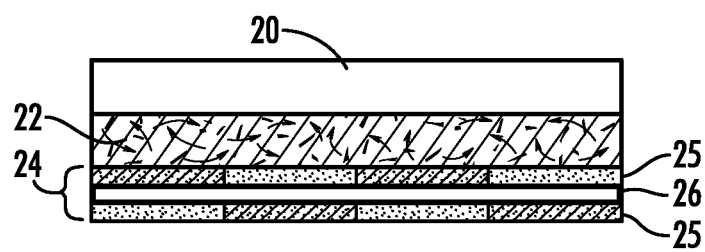
Figure 7:
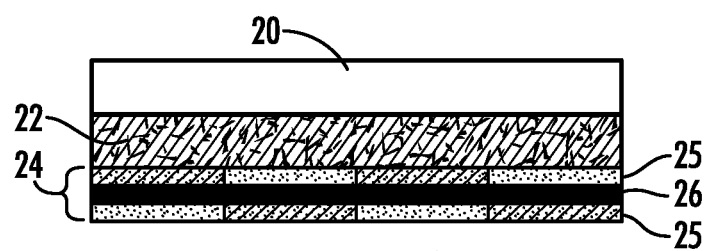
Figure 8:
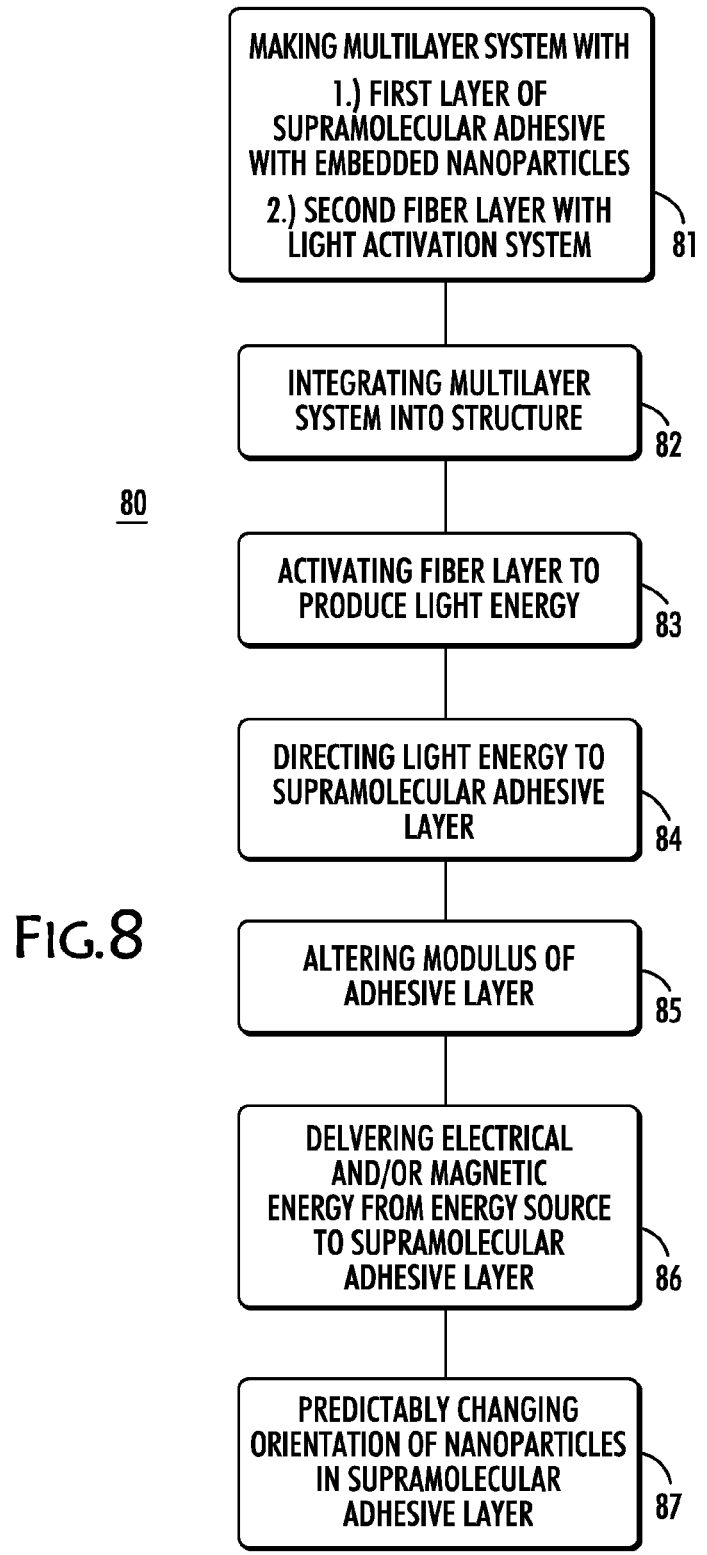
Figure 9:
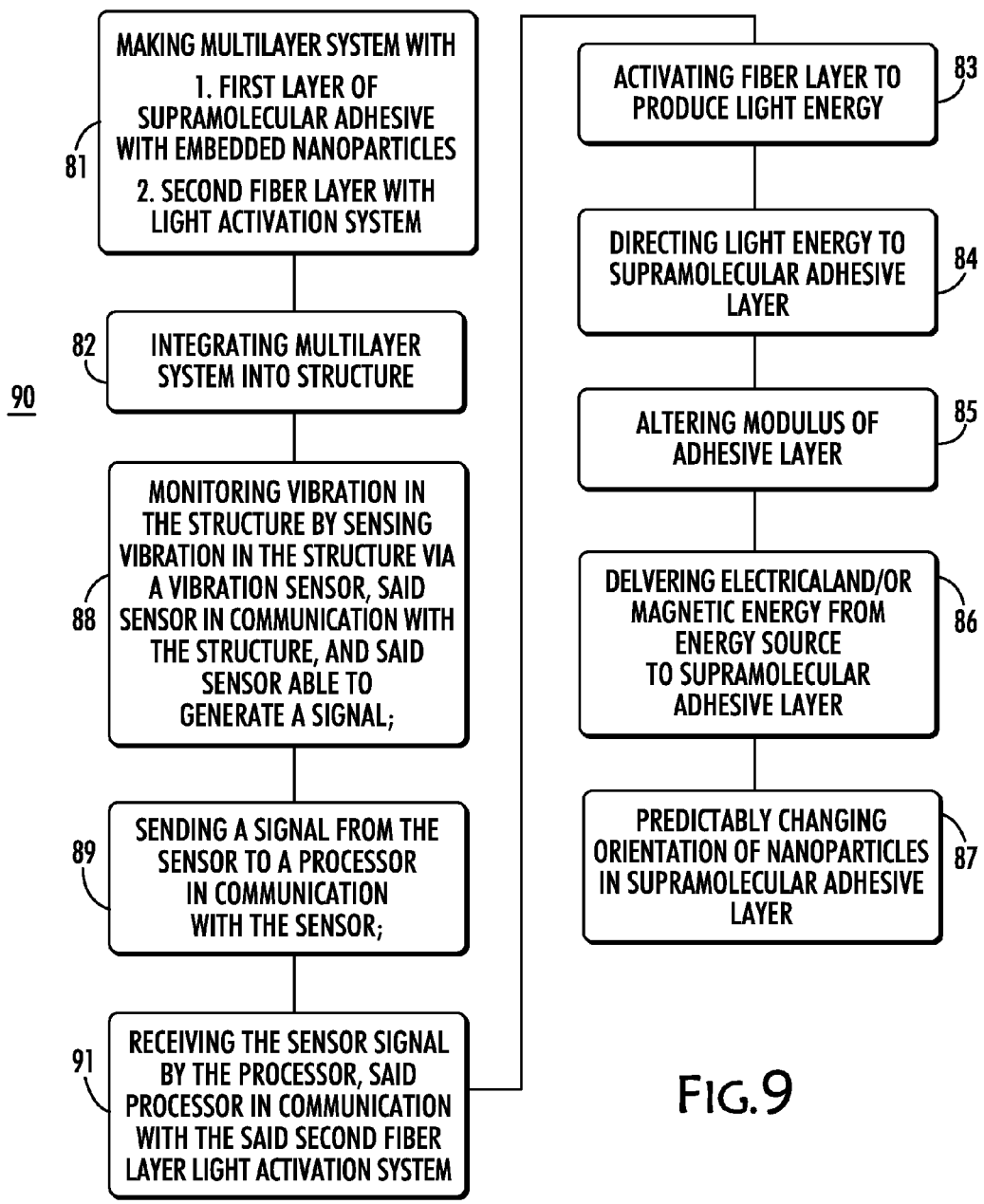
Figure 10:
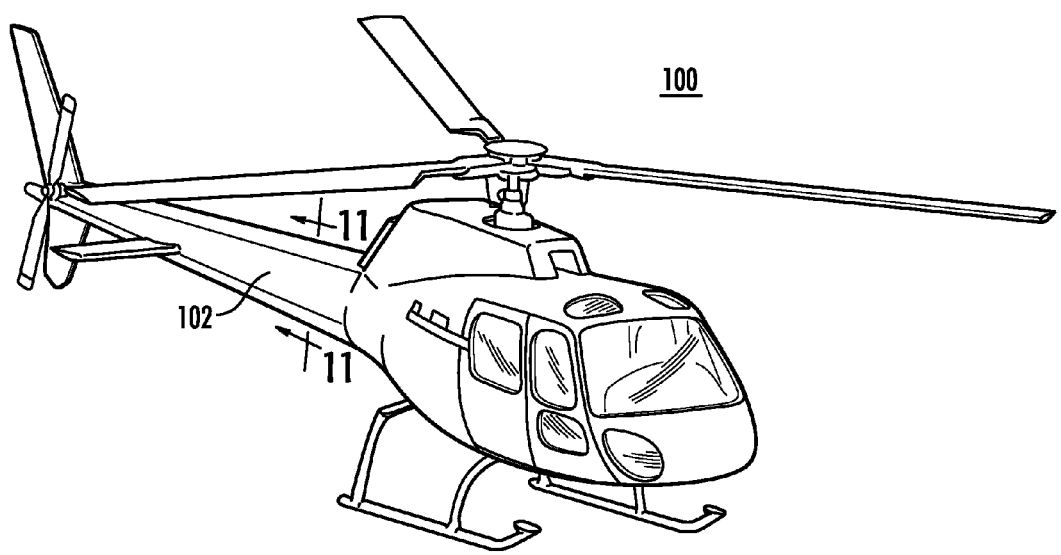
Figure 11:
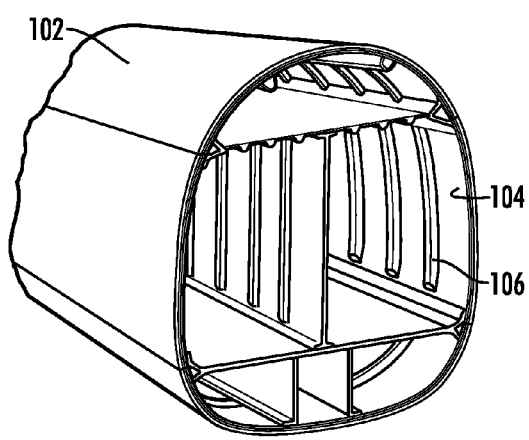

Having thus described variations of the disclosure in general terms, reference will now be made to the accompanying drawings, which are not necessarily drawn to scale, and wherein:

FIG. 1A is an exploded view of one aspect of the present disclosure showing a multilayered system;

FIG. 1B is an enlarged view of an adhesive layer from FIG. 1A showing embedded nanoparticles;

FIG. 1C is an enlarged view of a layer from FIG. 1A showing a light activation system;

FIG. 2 is a side view of a multilayered system according to an aspect of the present disclosure adhered to a structural layer;

FIG. 3 is a side view of the system of FIG. 2 showing a light source activated in the second layer, with light directed to the adhesive layer;

FIG. 4 is a side view of the system of FIG. 3 showing the adhesive layer changing its modulus;

FIG. 5. Is a side view of the system of FIG. 4 showing an electric field applied to the adhesive layer;

FIG. 6 is a side view of the system of FIG. 5 showing nanoparticles in the adhesive layer changing orientation to a realigned position;

FIG. 7 is a side view of the system of FIG. 6 showing the light source deactivated;

FIGS. 8 and 9 are flow charts of methods according to aspects of the present disclosure;

FIG. 10 is a drawing of an aircraft comprising aspects of the present disclosure; and FIG. 11 is a exposed view showing a section of an aircraft.

DETAILED DESCRIPTION

The present disclosure is directed to methods, systems and apparatuses for predictably changing the stiffness of a structure on-demand by altering or "tuning" a structure on-demand into various predetermined and desired stiffness modes. The term "on-demand" refers to the response time required to predictably change the stiffness of a structure. According to one aspect of the present disclosure, the stiffness of a structure may be altered substantially simultaneously in response to the detection of a vibrational occurrence. According to a further aspect, the stiffness of a structure or a region of a structure can be substantially simultaneously changed in advance of any vibrational occurrence. In one aspect, a disclosed multilayer reinforcement system is positioned proximate to, or adhered to, or coupled to, a structure. The multilayer system comprises, in a first layer, a reversible adhesive, such as, for example, a supramolecular adhesive comprising embedded nanoparticles. The embedded nanoparticles either have a first pre-selected or predetermined orientation, or have a random orientation within the adhesive. According to one aspect, a second layer is positioned proximate to, or adhered to, the adhesive layer. The second layer comprises a light activation system. In one aspect, the light activation system in the second layer comprises fiber optics and a fiber component in a matrix, such as, for example, a carbon fiber matrix component.

Stiffness is understood to be the rigidity of an object, such as, for example, a structure. The term "stiffness" therefore refers to the extent to which an object resists deformation in response to an applied force, such as, for example, vibrational forces, or "vibrations".

In one aspect, the adhesive is a supramolecular adhesive that, through its responsivity to light, has "reversible" or "switchable" adhesive properties and can "soften" or sustain a predictable and tailorable change in modulus on-demand. Such supramolecular adhesives are known that comprise supramolecular cross-linking components. The crosslinking components enable relatively short polymer chains to bond to one another to form long polymer chains. However, the bonding of these polymer chains is reversible. Such adhesives have been described by Heizmann, et al., of the Adolphe Merkle Institute (Fribourg, Switzerland). See *ACS Appl. Mater. Interfaces* 2014, 6, 4713-4719. According to aspects of the present disclosure, the supramolecular adhesives of interest allow for the temporary disassembly of the polymer upon exposure to an appropriate stimulus such as, for example, exposure to a visible light energy stimulus, IR energy stimulus or UV energy stimulus, etc.

The change in the supramolecular adhesive's viscosity and modulus, according to aspects of the present disclosure, would desirably be less than a change that significantly impacts the adhesive's adherence to a structure, but would provide a predetermined change in the adhesive's modulus and/or viscosity to allow for embedded nanoparticles to re-orient themselves and predictably realign when sufficient electrical, magnetic energy, and/or electro-magnetic energy is provided to the adhesive in the adhesive layer. The term "predictably realign" refers to achieving a desired and predetermined orientation. Such realignment contemplates changing the alignment of the embedded nanoparticles from a first alignment to a second desired and predetermined alignment.

As described by Heinzmann et al., id., suitable supramolecular adhesives include, for example, a telechelic poly (ethylene-co-butylene) functionalized with hydrogen bonding ureidopyrimidinone (UPy) groups at the termini, with heat being applied as the stimulus. Aspects of the present disclosure contemplate the use of supramolecular adhesives comprising metallosupramolecular compounds where defects in the compounds' polymer structure can be joined by exposing the adhesive to light, such as, for example, ultraviolet (UV) light, etc. As disclosed by Heinzmann, et al., such adhesives also may be based on a telechelic poly(ethylene-co-butylene), but are terminated with 2,6-bis (1'-methylbenzimidazoyl)-pyridine ligands. The building blocks for this polymer are disclosed as being assembled into polymeric structures with approximately stoichiometric amounts of $Zn^{2+}$ and $La^{3+}$ salts. The metal-ligand motifs absorb incident UV light and convert it into heat, causing the temporary dissociation of metal-ligand motifs and transforming the material into a low viscosity liquid. When light energy is discontinued, the metallopolymers re-assemble, and their original adhesive and other properties are restored.

According to aspects of the present disclosure, supramolecular adhesives, not limited to those disclosed by Heinzmann et al., are contemplated for use as a medium for a tunable, adhesive layer for predictably changing the stiffness of a structure on-demand in advance of, or in response to the presence of vibrational forces. Contemplated supramolecular adhesives therefore include, without limitation, adhesives comprising a telechelic poly(ethylene-co-butylene), that are terminated with 2,6-bis(1'-methylbenzimidazoyl)-pyridine ligands, and their derivatives and precursors. In another aspect, the adhesive comprises a supramolecular adhesive compound.

According to other aspects, a supramolecular adhesive is manufactured with embedded nanoparticles. The contemplated nanoparticles will set in the hardened supramolecular adhesive material in a predetermined or random orientation. However, according to aspects of the present disclosure, when the supramolecular adhesive layer is exposed to light energy, the modulus and viscosity of the adhesive is predictably changed, allowing the embedded nanoparticles to be influenced by electrical, magnetic, and/or electro-magnetic energy supplied, from an appropriate energy source, to the adhesive layer. According to further aspects, the amount, directionality, polarity and locality of electrical, magnetic, and/or electro-magnetic energy provided to the adhesive layer in its softened state is designed to predictably re-orient and/or realign the nanoparticles to a desired orientation and/or realignment. Once the nanoparticles are predictably re-oriented and/or realigned, the adhesive layer is allowed to re-set to a desired modulus/viscosity.

Light energy may be in the visible, IR and/or UV spectrum etc., with wavelengths ranging from about 250 nm to about 450 nm (with an intensity ranging from about 800 mW/cm² to about 1000 mW/cm²) being directed to the supramolecular adhesive in the first adhesive layer from the fiber optics or LED light array interwoven into the fabric matrix in the second fiber layer. In another aspect, light energy may be in the visible, IR and/or UV spectrum etc., with wavelengths ranging from about 320 nm to about 390 nm (with an intensity of about 900 mW/cm²) being directed to the supramolecular adhesive in the first adhesive layer from the fiber optics or LED light array interwoven into the fabric matrix in the second fiber layer. The second fiber layer further comprises carbon fibers, glass fibers or combinations thereof, and according to one aspect, the carbon and/or glass fibers are interwoven with fiber optic components (e.g. fiber optic wires) to form the fiber matrix of the second fiber layer.

However, it is understood that such light wavelength and intensity required will vary depending upon the desired degree of nanoparticle re-orientation and/or realignment, and depending upon the selected supramolecular adhesive. According to further aspects, the present disclosure contemplates delivering the light from a light source via fiber optic components, such as, for example, fiber optic wires that are interwoven into a matrix in a second fiber layer, along with useful fibers such as, for example and without limitation, carbon fiber, glass fiber, etc., and combinations thereof. According to one aspect, carbon fiber thicknesses can range from about 0.004 in to about 0.025 in. According to a further aspect, contemplated fiber optic wire thicknesses typically range from about $3.93 \times 10^{-5}$ inches, but may be as thick as desired. The contemplated LED array can be a plate proximate to, or strips interwoven into, a fiber matrix. Contemplated LED arrays have a thickness ranging from about 0.015 inches to about 0.38 inches.

Electrical energy in a suitable amount to generate a desired degree of nanoparticle realignment is contemplated to be required and supplied from at least one energy source and delivered through at least one energy input in communication with the first adhesive layer to predictably re-orient and/or realign the nanoparticles embedded in the softened supramolecular adhesive, as would be understood by one skilled in the field. It is further understood that such electrical energy amounts and inputs will vary depending upon the desired degree of nanoparticle re-orientation and/or realignment and depending upon the selected supramolecular adhesive. It is understood that an electrical energy source delivers, on-demand, electrical energy to the first adhesive layer via at least one electrical input in communication with the adhesive layer. It is further understood that capacitors and other electrical components can be incorporated within and/or throughout the adhesive layer, as would be readily understood by one skilled in the field.

In addition, electrical, magnetic and/or electro-magnetic energy may be provided to the first adhesive layer at any desired location(s) along, for example, one or more edges of the adhesive layer, or electrical inputs and other connections may occur throughout the adhesive layer as desired. When multiple electrical connections are provided to the adhesive layer, it is understood that various controllers and computer programs and processors may be used in conjunction to regulate the release of and to otherwise direct the energy to, the adhesive layer in concert with, or in a programmed progression to achieve the desired nanoparticle re-orientation and/or realignment from a first orientation to any desired re-orientation. Such designs are restricted only by the geometry of the multilayer system, and the structures incorporating the multilayered systems. The pattern and intensities of the electrical, magnetic and/or electro-magnetic inputs will contribute to determining the multilayer system by controlling the direction, rate, and degree of the nanoparticle re-orientation and realignment. Combining multiple adhesive and fiber layers with various electrical energy inputs, and programming controlling the delivery of electrical signals to the adhesive layer or layers will predictably change the stiffness of the multilayer system, and therefore the stiffness of the structures to which the multilayered system is attached, or located proximate to, for generating an on-demand response to a vibrational episode. When the reinforced structure is an aircraft or rotorcraft component, it is understood that the vibration response will be designed to occur on-demand and in-flight.

The combination of the light energy provided to predictably soften the supramolecular adhesive, and the energy provided to the adhesive layer to predictably change the orientation and/or alignment of the nanoparticles embedded within the softened supramolecular adhesive, alters the properties of the supramolecular adhesive on-demand, to provide a changed material that predictably changes the stiffness in a structure in advance of or in response to the presence of vibrational forces in a structure. It is understood that aspects of the methods, systems, structures and apparatuses of the present disclosure assist structures in redirecting load path experienced by such structures during operation. Multiple, and potentially infinitely-altered stiffness modes are contemplated as achievable, limited only by the possible nanoparticle orientations, and re-orientations.

Contemplated nanoparticles include, without limitation, nanoparticles comprising metals, metal oxides, carbon nanotubes (CNTs), boron nitride nanotubes (BNNTs), etc., with the understanding that any nanoparticles possessing the required properties, and that are capable of predictably re-orienting and/or realigning may be used. The nanoparticles may be asymmetrically charged, negatively or positively charged, etc., and possess a size ranging from about 1 to about 1000 nm. Particularly useful CNTs and BNNTs have a contemplated diameter of about 4 nm with widely ranging lengths and aspect ratios, again, with the understanding that any CNT and/or BNNT nanoparticles possessing the required properties, and that are capable of predictably re-orienting and/or realigning may be used. It is further understood that the energy provided to the softened adhesive layer with the embedded nanoparticles, predictably causes the nanoparticles to re-orient and/or realign in three dimensions in common movement relative to one another, an through a predetermined degree shift of from 1° to 359°, on-demand, and as desired.

According to aspects, the variable and programmable on-demand light input predictably alters the modulus of the adhesive in the adhesive layer. In addition, once the adhesive is softened (the adhesive modulus and viscosity is altered) to the desired degree, the variable and programmable on-demand electrical, magnetic and/or electro-magnetic charge provided from an electric, magnetic and/or electro-magnetic source predictably alters the orientation and/or alignment of the nanoparticles embedded with the adhesive layer.

The multilayer systems of the present disclosure may comprise more than one of the adhesive layers and more than one of the fiber layers as desired, to achieve an optimal three-dimensional (3D) reinforcement system for mitigating vibrational effects on-demand, as described herein. It is further understood that the multilayer systems presented herein may be incorporated substantially throughout a particular structure or vehicle globally to respond locally or globally when need to vibrational levels anywhere throughout a structure, or may be located at only strategically-placed regions, such as, for example, those known to typically sustain vibrational forces of concern. The nanoparticle-embedded adhesives disclosed herein allow the multilayer system to conditionally and predictably change the stiffness of a part or parts, a region or region, and/or an entire airframe, on-demand. According to aspects of the present disclosure, the stiffness of a part, including but not limited to, structural parts and airframes is predictably changed on-demand by predictably altering on-demand the modulus of the adhesive, thereby selectively increasing or decreasing not only the rigidity of the multilayer system, but the entire structure incorporating the multilayer system.

With respect to use in terrestrial, marine (surface and sub-surface waterborne) and aircraft/spacecraft/rotorcraft vehicles (all or any of which may be manned or unmanned), according to aspects of the disclosure, the multilayer systems described herein allow for the overall design of such vehicles (e.g. weight, dimension, displacement, etc.) to be achieved independently of the ordinary concerns taken into account to mitigate sustained, periodic and otherwise expected and anticipated vibrational forces encountered during vehicle operation. Such independence in design results in the elimination of "parasitic" weight distribution in such vehicles, further resulting in operational increases in range, speed and payload, etc., while decreasing fuel consumption. Further, aspects of the present invention can facilitate use of next generation materials as well as existing materials as candidate materials for use in the construction of such vehicles and even stationary structures, such as for example, generators, wind turbines, etc.

As shown in FIG. 1A, a multilayer structure 10, comprises a supramolecular adhesive layer 12 comprising embedded particles. A fiber layer 14 comprises interwoven fibers supporting interwoven optical fibers. Structure 11 represents the structure to which the adhesive layer 12 is adhered or otherwise adjoins. FIG. 1B is an enlarged view of the supramolecular adhesive layer 12 showing more clearly the embedded nanoparticles 13. FIG. 1C is an enlarged view showing more clearly the fiber layer 14 comprising fibers 16 interwoven with optical fibers 17. Though not shown, it is understood that adhesive layer 12 may be sandwiched between a fiber layer 14 and a base (not shown). In this aspect, a first side of the base would be in contact with adhesive layer 12. A second side of the base would then be placed into contact with structure 11. In this way, the multilayered system of the present disclosure comprising the adhesive layer 12 and the fiber layer 14 can either be applied to a structure 11, or if desired, the multilayered system may comprise a base in contact with the adhesive layer 12.

FIG. 2 is a side view showing a multilayer structure adhered to or otherwise adjoining a structural layer 20. As shown, the multilayer structure comprises the supramolecular adhesive layer embedded with nanoparticles 22 sandwiched between the structural layer 20 and a fiber layer 24. Fiber layer 24 comprises a carbon fiber ply 25 interwoven with optical fibers or an LED plate 26. Energy inputs 28 are shown in communication with supramolecular adhesive layer 22. While not shown, it is understood that the optical fibers 26 in the fiber layer 24 are in communication with a light energy source. In FIG. 2, it is understood that no light is being transmitted through the optical fibers. Therefore the fiber layer 24 is in an "off", or non-operational mode.

FIG. 3 is a side view of the multilayer structure shown in FIG. 2, where the optical fibers 26 in the fiber layer 24 are transmitting light from a light energy source (not shown). Therefore, in FIG. 3 the fiber layer 24 is "on", or in an operational mode, and light energy is transmitted from the fiber layer 24 to the supramolecular adhesive layer 22.

FIG. 4 is a side view of the multilayer structure shown in FIGS. 2-3, where the optical fibers 26 in the fiber layer 24 are transmitting light from a light energy source (not shown) and the fiber layer 24 is "on" and light energy is being transmitted from the fiber layer 24 to the supramolecular adhesive layer 22. FIG. 4 shows the supramolecular adhesive layer 22 absorbing light energy from the optical fibers 26 in the fiber layer 24, and reacting by changing its modulus and viscosity as it "softens".

In FIG. 5, electrical or magnetic energy is activated from an electrical and/or magnetic energy source (not shown), directing energy to the supramolecular adhesive layer 22 via energy inputs 28. According to one aspect, an electric and/or magnetic field is activated in a desired direction, predictably influencing the orientation of the embedded nanoparticles located within the supramolecular adhesive layer 22. In FIG. 6, the embedded nanoparticles in the supramolecular adhesive layer are predictably realigned, and/or re-oriented (as shown by the arrows indicating predetermined nanoparticle movement, realignment and re-orientation). In FIG. 7, the light source is turned "off" (indicated by "layer" 26 being "black") and the fiber optics 26 in fiber layer 24 cease directing light energy to the supramolecular adhesive layer 22. In the absence of the light energy, the supramolecular adhesive then "re-hardens", but the realigned and/or re-oriented embedded nanoparticles have predictably and desirably changed the vibrational characteristics of the supramolecular adhesive layer, and, in turn have changed the vibrational characteristics of the structure 20 to which the supramolecular adhesive layer is attached or adhered or otherwise adjoins.

According to one aspect of the present disclosure, a method 80 for changing the stiffness of a material and the part and/or structure comprising the material is shown in the flow chart presented as FIG. 8. In step 81, a multilayer system is made comprising a first layer comprising a supramolecular adhesive having a first modulus value embedded with nanoparticles oriented in a first orientation, and a second fiber layer positioned proximate to the first layer. The second fiber layer comprises a light activation system. In step 82, the multilayer system is integrated into a structure susceptible to vibration. In step 83, the second layer is activated to produce light energy. In step 84, the light energy produced by the second fiber layer is directed to the first adhesive layer. In step 85, upon receiving light energy from the second fiber layer, the supramolecular adhesive in the first adhesive layer undergoes a modulus alteration from a first modulus value to a second modulus value. Step 86 comprises delivering electrical and/or magnetic energy from an energy source to the supramolecular adhesive in the first adhesive layer. Step 87 comprises predictably changing the orientation and/or alignment of nanoparticles in the supramolecular adhesive to a second orientation. It is understood that the electrical and/or magnetic energy source of step 86 may be an electro-magnetic energy source.

According to a further aspect of the present disclosure, a method 90 changing the stiffness of a material and the part and/or structure comprising the material is shown in the flow chart presented as FIG. 9. In step 81, a multilayer system is made comprising a first layer comprising a supramolecular adhesive having a first modulus value embedded with nanoparticles, and a second fiber layer positioned proximate to the first layer. The second fiber layer comprises a light activation system. In step 82, the multilayer system is integrated into a structure susceptible to vibration. In step 88, the vibration in the structure to which the multilayer system is attached is monitored by sensing vibration in the structure via at least one vibration sensor. The sensor is in communication with the structure and able to generate a signal. In step 89 the signal is sent from the sensor to a processor in communication with the sensor. In step 91 a signal is received by the processor that is in communication with the second fiber layer light activation system. In step 83, the second fiber layer is activated to produce light energy. In step 84, the light energy produced by the second fiber layer is directed to the supramolecular adhesive in the first adhesive layer. In step 85, upon receiving light energy from the second fiber layer, the supramolecular adhesive in the first adhesive layer undergoes a modulus alteration from a first modulus value to a second modulus value. Step 86 comprises delivering electrical and/or magnetic energy from an energy source to the supramolecular adhesive in the first adhesive layer. Step 87 comprises predictably changing the orientation and/or alignment of nanoparticles in the supramolecular adhesive to a second orientation based on the vibration sensed by a sensor. It is understood that the electrical and/or magnetic energy source of step 86 may be an electro-magnetic energy source.

FIG. 10 is a drawing of a rotorcraft 100 with showing a fuselage panel 102 comprising parts having the systems and apparatuses described herein.

FIG. 11 is a representative drawing of a cut-away view of fuselage section 102 of the rotorcraft 100 (shown in FIG. 10), showing interior features including an interior skin 104 and support stringers 106. It is understood that aspects of the multilayer systems disclosed herein may be incorporated into any structural feature or features and/or region and regions of a rotorcraft, or may be incorporated as a layered system, or layered apparatus throughout the entire rotorcraft structure, including interior and exterior regions, etc.

It is understood that the multilayered structures of the present disclosure may be incorporated into, adhered to, positioned to adjoin, or integrated with any load-bearing or non-load-bearing structure that is susceptible to vibrational forces during operation, and for which a tunable stiffness of the load-bearing or non-loadbearing structure would be desirable. For example, according to certain aspects, the multilayered structure may be incorporated into a structure as laminate layers, for example, during manufacture of a structure. According to other aspects, the multilayered system may be bonded, or adhered to, or otherwise adjoin the inner surface of aircraft, skins, panels, stringers, frame components, etc., such as, for example as an addition via post-manufacture procedures, as would be readily understood by one skilled in the field. Indeed, aspects of the methods, systems apparatuses and structures of the present disclosure are contemplated as finding utility in any and all manned and unmanned vehicles including, without limitation, aircraft, spacecraft, rotorcraft, rockets, satellites, drones, terrestrial vehicles and surface and sub-surface waterborne vehicles, and combinations thereof.

According to further aspects, the disclosed multilayer system may be incorporated into stationary structures that are susceptible to vibrational forces such as, for example, generators, wind turbines, etc., or may even be incorporated into buildings and other stationary structures, such as, for example, large structures occurring in regions where earthquakes, wind, and other forces may induce regular or irregular vibrational forces where it would be desirable to mitigate such forces to preserve the performance and structural integrity of a structure.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method for changing the stiffness of a structure comprising the steps of:
    activating a multilayer system in the structure, said multilayer system comprising:
        a first layer comprising an adhesive embedded with nanoparticles, said adhesive have a first modulus value, and said nanoparticles oriented in a first orientation;
        a second layer proximate to the first layer, said second layer comprising a light activation system; and
        an energy input in communication with an energy source and said energy input in communication with the first adhesive layer;
    producing light in the second layer;
    directing light produced by the second layer to the first layer;
    altering the modulus of the adhesive from said first modulus value to a second modulus value;
    delivering energy from the energy source to the first adhesive layer via the energy input; and
    changing the orientation of the nanoparticles in the first layer.

2. The method of claim 1, wherein the adhesive comprises a supramolecular adhesive compound.

3. The method of claim 2, wherein the supramolecular adhesive compound comprises a metallosupramolecular adhesive compound.

4. The method of claim 2, wherein the supramolecular adhesive compound comprises a telechelic poly(ethylene-co-butylene) terminated with 2,6-bis(1'-methylbenzimidazoyl)-pyridine ligands.

5. The method of claim 1, wherein the nanoparticles comprise metal-containing nanoparticles, metal oxide-containing nanoparticles, carbon nanotubes, boron nitride nanotubes, and combinations thereof.

6. The method of claim 1, wherein the energy source comprises at least one of an electric energy source, a magnetic energy source, an electro-magnetic energy source, and combinations thereof.

7. The method of claim 1, wherein second layer comprises a fiber optic component, said fiber optic component interwoven into a matrix.

8. The method of claim 7, wherein the matrix comprises carbon fiber, glass fiber, and combinations thereof.

9. The method of claim 1, wherein the second layer further comprises an LED array.

10. The method of claim 1, further comprising re-orienting the nanoparticles in a predetermined orientation based on an amount of energy provided to the first layer by the energy input.

11. The method of claim 1, further comprising re-orienting on-demand the orientation of at least a portion of the nanoparticles.

12. The method of claim 1, further comprising the steps of:
    monitoring vibration in the structure by sensing vibration in the structure via a vibration sensor, said sensor in communication with the structure, and said sensor able to generate a signal;
    sending a signal from the sensor to a detector in communication with the sensor; and
    receiving the sensor signal by the detector, said detector in communication with said second layer.

13. The method of claim 1, wherein the first layer comprises a plurality of regions, and further comprising the step of:
    selectively changing the orientation of the nanoparticles in at least a first region of the first layer.

14. A multilayer structure comprising:
    a first layer comprising an adhesive embedded with nanoparticles, said adhesive have a first modulus value, and said nanoparticles oriented in a first orientation;
    a second layer proximate to the first adhesive layer, said second layer comprising a light activation system; and
    an energy input in communication with an energy source and said energy input in communication with the first layer.

15. The structure of claim 14, wherein the adhesive comprises a supramolecular adhesive compound.

16. The structure of claim 15, wherein the supramolecular adhesive compound comprises a telechelic poly(ethylene-co-butylene) terminated with 2,6-bis(1'-methylbenzimidazoyl)-pyridine ligands.

17. The structure of claim 14, wherein the nanoparticles comprise: metal-containing nanoparticles, metal oxide-containing nanoparticles, carbon nanotubes, boron nitride nanotubes, and combinations thereof.

18. The structure of claim 14, wherein the energy source comprises: an electric source, a magnetic energy source, an electro-magnetic energy source, and combinations thereof.

19. The structure of claim 14, wherein second layer comprises a fiber optic component, said fiber optic component interwoven into a matrix.

20. The structure of claim 19, wherein the matrix comprises a material comprising: carbon fiber, glass fiber and combinations thereof.

21. The structure of claim 14, wherein an amount of energy provided to the first layer by the energy input predictably re-orients the nanoparticles in the first layer.

22. The structure of claim 14, wherein the orientation of the nanoparticles is changed on-demand.

23. The structure of claim 14, further comprising:
    a sensor for sensing vibration in the structure, said sensor in communication with the structure, and said sensor able to generate a signal; and
    a processor in communication with the sensor.

24. The structure of claim 14, wherein the multilayer structure is incorporated into a stationary structure.

25. The structure of claim 14, wherein the multilayer structure is incorporated into a vehicle.

26. The structure of claim 24, wherein the vehicle is selected from the group comprising: a manned aircraft, a manned spacecraft, a manned rotorcraft, an unmanned aircraft, an unmanned spacecraft, an unmanned rotorcraft, a manned terrestrial vehicle, an unmanned terrestrial vehicle, a manned waterborne vehicle, an unmanned waterborne vehicle, and combinations thereof.

* * * * *